United States Patent [19]

Ohshima

[11] Patent Number: 4,942,009

[45] Date of Patent: Jul. 17, 1990

[54] METHOD OF MANUFACTURING A FERRULE

[75] Inventor: Tsutomu Ohshima, Ayase, Japan

[73] Assignee: Amp Incorporated, Harrisburg, Pa.

[21] Appl. No.: 326,438

[22] Filed: Mar. 21, 1989

Related U.S. Application Data

[63] Continuation of Ser. No. 225,584, Jul. 27, 1988, abandoned, which is a continuation of Ser. No. 47,224, filed as PCT US86/01792 on Sep. 2, 1986, abandoned.

[30] Foreign Application Priority Data

Sep. 27, 1985 [JP] Japan ................................ 62-214442

[51] Int. Cl.$^5$ ............... B29C 33/30; B29C 33/76; B29C 45/36
[52] U.S. Cl. ................................ 264/317; 264/1.5; 264/318; 264/328.1; 264/334
[58] Field of Search .............. 264/1.5, 328.1, 334, 264/317, 318

[56] References Cited

U.S. PATENT DOCUMENTS

| | | | |
|---|---|---|---|
| 4,159,300 | 6/1979 | Wise | 264/278 |
| 4,195,045 | 3/1980 | Mead | 264/1.5 |
| 4,292,260 | 9/1981 | Cheung | 264/1.5 |
| 4,410,561 | 10/1983 | Hart, Jr. | 264/1.5 |

FOREIGN PATENT DOCUMENTS

| | | | |
|---|---|---|---|
| 120008 | 9/1980 | Japan | 264/1.5 |
| 83711 | 7/1981 | Japan | |
| 205705 | 12/1982 | Japan | |
| 28111 | 2/1984 | Japan | |
| 88712 | 5/1984 | Japan | |
| 109010 | 6/1984 | Japan | |

*Primary Examiner*—James Lowe

[57] ABSTRACT

A method of manufacturing a ferrule is disclosed which comprises positioning a wire inside a cavity in a molding die for forming the ferrule, introducing plastic material in the cavity thereby forming the ferrule with the wire extending through an end of the ferrule, and withdrawing the wire from the ferrule whereby a small hole is formed in which a core of an optical fiber is to be received.

15 Claims, 4 Drawing Sheets

METHOD OF MANUFACTURING A FERRULE

This application is a continuation of application Ser. No. 07/225,584, filed July 27, 1988, now abandoned, in turn, a continuation of application Ser. No. 07/047,224, filed as PCT US86/01792 on Sep. 2, 1986, now abandoned.

FIELD OF THE INVENTION

This invention relates to a method of manufacturing a ferrule and more particularly to a ferrule as part of an optical connector used for connecting to an optical fiber.

BACKGROUND OF THE INVENTION

Formerly, a ferrule for an optical connector has been made from a suitable plastic material by injection molding, and forming a hole through the front end of the ferrule by a core pin in the molding die at the time of the injection molding so that an optical fiber core can be inserted into.

However, the diameter of the above-mentioned hole to receive the optical fiber core is extremely small, and thus it is necessary to make the diameter of the core pin extremely small. Accordingly, the core pin is very easily broken or bent and, thus a problem arises in that the productivity of the ferrule is lessened because the core pin is often bent or broken when it is fitted in the molding die.

An object of this invention is therefore to provide a method whereby the injection molding of the ferrule with a hole to receive the optical fiber core at the front end can be carried out efficiently, without the use of a core pin.

According to the present invention, a method of manufacturing a ferrule is disclosed which comprises positioning a wire inside a cavity in a molding die for forming the ferrule, introducing plastic material in the cavity thereby forming the ferrule with the wire extending through an end of the ferrule, and withdrawing the wire from the ferrule whereby a small hole is formed in which a core of an optical fiber is to be received.

The invention is illustrated by way of example by reference to the following drawings:

DETAILED DESCRIPTION

Figure 1:
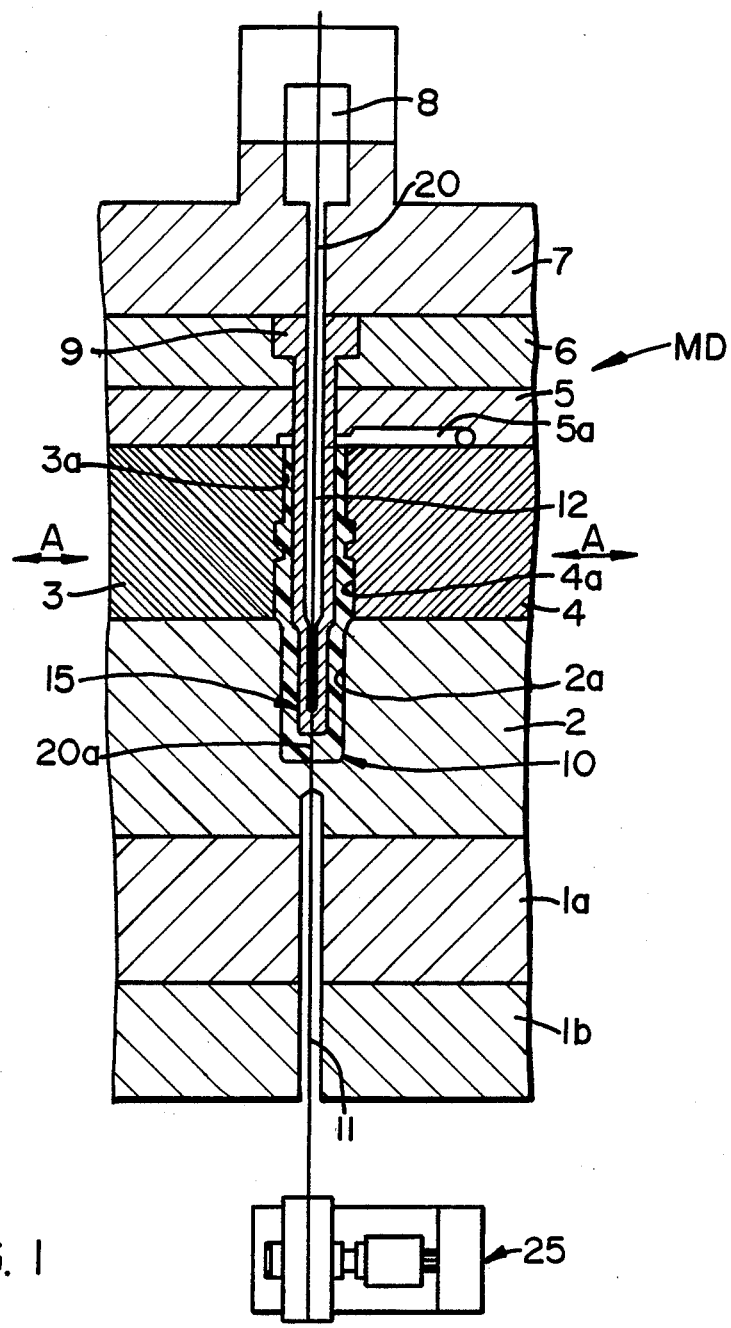
FIG. 1 is a cross sectional view of a molding die by which the method of this invention is to be practiced.

FIG. 1 shows a molding die MD used in the manufacturing method of this invention, wherein the lower molding die 2 has a portion 2a, which forms the lower part of a ferrule, and is mounted on fixed plates 1a and 1b. Upper molding dies 3 and 4 having U-shaped portions 3a and 4a, which are movable in the directions of arrows A for forming the upper part of the ferrule, are movably mounted on lower molding die 2. Further, a plate 5 having a channel 5a through which the plastic is injected is mounted on the upper molding dies 3 and 4. A core-retaining plate 6 to retain a core 9 is mounted on plate 5, and a movable plate 7, which moves in the vertical direction, is on the core-retaining plate 6.

To carry out an injection molding operation by using the molding die MD constructed as explained above, first, the core 9 is arranged between the portions 3a and 4a of upper molding dies 3 and 4, and projects toward portion 2a of lower molding die 2. Upper molding dies 3 and 4 are then closed forming molding cavity 10 having the shape of a ferrule, which is defined by the portions 3a and 4a of upper molding dies 3 and 4, the portion 2a of lower molding die 2, and core 9. Next, wire 20 extends along cavity 10 through hole 12 in movable plate 7 and core 9, and through hole 11 of lower plates 1a and 1b and lower molding die 2. At this stage, portion 20a of wire 20 disposed in the bottom part of cavity 10 will pass through the front end of the ferrule when it is molded in cavity 10 and will correspond to the optical fiber core that will be disposed in the hole formed by wire 20.

Wire 20 is clamped lightly at one end by clamp 8 on movable plate 7, and the lower end thereof is slowly wound onto a take-up device 25. By clamping wire 20 to clamp 8 while wire 20 is wound onto take-up device 25, a steady tension is applied to wire 20, and thus wire 20 is kept straight and centered. Accordingly, while wire 20 is slowly placed under a predetermined tension, plastic material is injected or introduced into cavity 10 through channel 5a of plate 5 and ferrule 15 is injection-molded therein by filling cavity 10.

Then, wire 20 is cut below the molded ferrule, and core-retaining plate 6, plate 5 and core 9 are moved upward together with movable plate 7 along with wire 20, thus wire 20 is drawn out from molded ferrule 15 inside cavity 10. Upper molding dies 3 and 4 are then shifted to the left and right respectively, to separate them from each other, and ferrule 15 is removed from portion 2a of lower molding die 2. Thus, the manufacture of the ferrule is completed with a small precise hole in the front end of the ferrule where wire 20 was located.

Figure 2A:
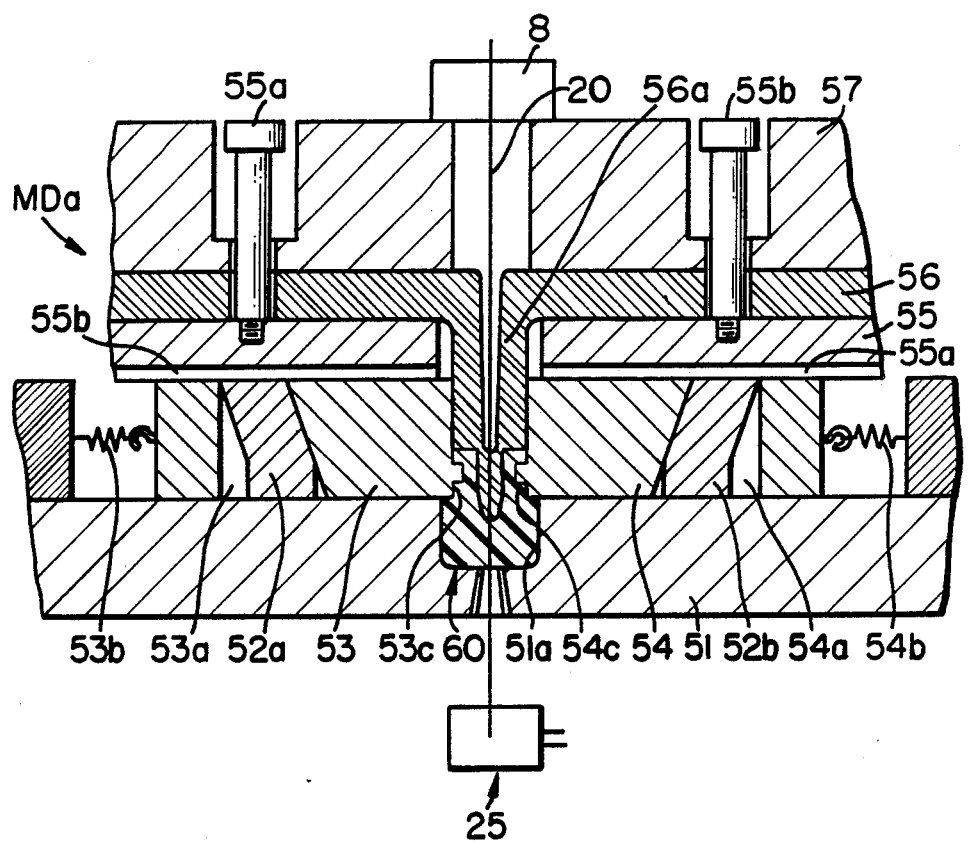
FIGS. 2A and 2C are cross sectional views of different examples of the molding die of this invention for illustrating the operation thereof.
Figure 2B:
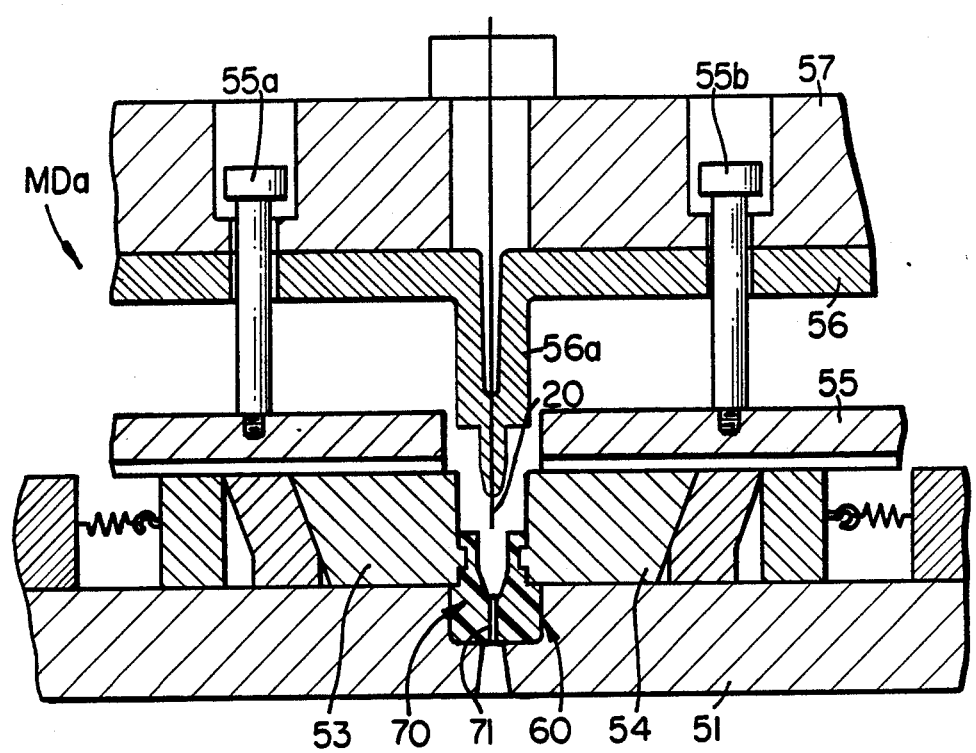
Figure 2C:
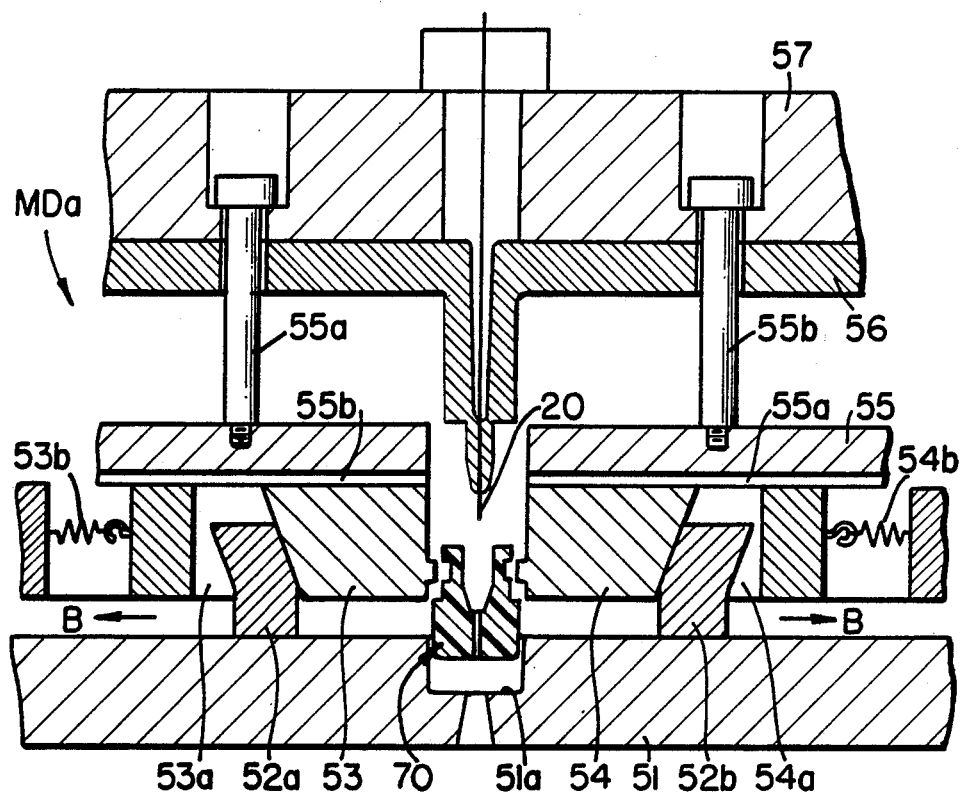

FIGS 2A to 2C show another example of the method of this invention. Molding die MDa used in this method comprises a fixed plate 51 having a molding cavity 51a which forms the external shape of the lower part of the ferrule, a pair of upper molding dies 53 and 54 having U-shaped portions 53c and 54c movably mounted on fixed plate 51 and form the external shape of the upper part of the ferrule. A guide plate 55 retains upper molding dies 53 and 54, and they can slide freely right and left along the guide slots 55a and 55b of guide plate 55. A core plate 56 includes an integral core 56a, and plate 57 is movable vertically; both plates 56,57 are arranged over dies 53,54. Further, bolts 55a and 55b penetrate core plate 56 and movable plate 57, and are threaded to guide plate 55. Also, for receipt of each molding die 53 and 54, cam guide cavities 53a and 54a are formed in dies 53,54, and cams 52a and 52b, which are mounted on fixed plate 51 project into cam guide cavities 52a and 54a. Furthermore, each of upper molding dies 53 and 54 is forced apart from each other by tension springs 53b and 54b as shown in FIG. 2C.

The following is an explanation of the method of manufacturing a ferrule using molding die MDa.

First, when movable plate 57 is moved down to the position shown in FIG. 2A from the position shown in FIG. 2C, together with core plate 56 and guide plate 55, upper molding dies 53,54 move toward each other along the sloping surface of cams 52a and 52b projecting inside cam guide cavities 53a and 54a so that cavity 60 is formed by molding portions 53c and 54c together with the molding cavity 51a in fixed plate 51. Then, as in FIG. 1, wire 20 is positioned along core 56a and cavity 60 whereafter plastic material is injected or introduced into cavity 60 while applying the predetermined tension to wire 20 by clamp 8 and the take-up device 25.

After completing the injection of the plastic material into cavity 60, the lower end of wire 20 is cut off, and movable plate 57 is moved up to the position shown in FIG. 2B. Core plate 56 is connected to movable plate 57, and therefore, since both of the plates 57 and 56 are vertically movable with respect to bolts 55a and 55b which are fitted to guide plate 55, only movable plate 57 and core plate 56 move up, whereby core 56a is moved out of ferrule 70 which has been molded in cavity 60. At this time, wire 20 is cut and drawn out of ferrule 70 without having to remove the wire 20 from the ferrule 70, as shown in FIGS. 2B and 2C, and the small hole having the same diameter as the wire is formed at the end of ferrule 70. When movable plate 57 moves further up, it engages with the heads of bolts 55a and 55b as shown in FIG. 2C so that the bolts are pulled upward. The bolts are connected to guide plate 55 which, in turn, carries upper molding dies 53 and 54 which are horizontally slidable along the guide slots of the guide plate, and, therefore, guide plate 55 and upper molding dies 53,54 move up together with bolts 55a and 55b. At this time, ferrule 70 is also moved up because it is retained by upper molding dies 53 and 54, and thus ferrule 70 is removed from molding cavity 51a of fixed plate 51. Also, when upper molding dies 53 and 54 move up, they are caused to slide away from each other along the sloped surfaces of cams 52a, 52b by tension springs 53b and 54b; therefore, ferrule 70 is removed from upper molding dies 53 and 54, thus the manufacture of the ferrule is completed.

According to the present invention, since a wire under applied tension is used instead of a core pin to form the hole of the ferrule to receive the optical fiber core, when injection molding of the ferrule takes place, problems such as a bent or broken core pin, as in the former method, are avoided, and therefore, the production efficiency is improved.

I claim:

1. In a method of manufacturing a ferrule having a small hole in a front end of the ferrule in which a core of an optical fiber is to be received, comprising the steps of; positioning a wire having a diameter of the small hole in a cavity of moulding means for forming the ferrule, introducing mouldable material in the cavity for forming the ferrule by the moulding means with the wire extending through the end of the ferrule, and removing the wire from the end of the ferrule whereby the small hole is formed therein, the improvement comprising the steps of;
    passing the wire along a hole through a moveable core that is positioned in the cavity prior to introducing mouldable material in the cavity for forming the ferrule over the core, and
    moving the core and the wire to draw out the core and the wire from the ferrule without having to remove the wire from the core.

2. In a method as recited in claim 1, the improvement further comprising the step of;
    placing the wire under tension slowly during the step of introducing moldable material in the cavity.

3. In a method as recited in claim 2, the improvement further comprising the step of;
    cutting the wire beyond the end of the core and beyond the end of the ferrule before removing the wire from the end of the ferrule.

4. In a method as recited in claim 2, the improvement further comprising the step of;
    cutting the wire before moving the core and the wire.

5. In a method as recited in claim 2, the improvement further comprising the steps of;
    securing to the core a moveable plate means for removing the core from the ferrule, and
    moving the plate means and the core to draw out the core from the ferrule.

6. In a method as recited in claim 5, the improvement further comprising the step of;
    moving a portion of the moulding means together with the plate means for removing the ferrule from the cavity.

7. In a method as recited in claim 1, the improvement further comprising the step of;
    cutting the wire beyond the end of the core and beyond the end of the ferrule before removing the wire from the end of the ferrule.

8. In a method as recited in claim 3, the improvement further comprising the steps of;
    securing to the core a moveable plate means for removing the core from the ferrule, and
    moving the plate means and the core to draw out the core from the ferrule.

9. In a method as recited in claim 8, the improvement further comprising the steps of;
    moving a portion of the moulding means together with the plate means for removing the ferrule from the cavity.

10. In a method as recited in claim 8, the improvement further comprising the step of;
    introducing the moldable material into the cavity while the wire is slowly placed under tension.

11. In a method as recited in claim 1, the improvement further comprising the step of;
    cutting the wire before moving the core and the wire to draw out the core and the wire from the ferrule.

12. In a method as recited in claim 1, the improvement further comprising the steps of;
    securing to the core a moveable plate means for removing the core from the ferrule, and
    moving the plate means and the core to draw out the core from the ferrule.

13. In a method as recited in claim 12, the improvement further comprising the step of;
    moving a portion of the moulding means together with the plate means for removing the ferrule from the cavity.

14. A method of manufacturing a ferrule having a small hole in an end of the ferrule in which an optical core of an optical fiber cable is to be received, comprising the steps of:
    positioning a core member having a wire extending through a hole in the core member into a cavity of molding means for forming the ferrule with the wire having a diameter of the small hole and extending across the cavity;
    introducing moldable material into the cavity for forming the ferrule with the wire extending through the end of the ferrule while the wire is under tension; and
    moving the core member and the wire relative to the mold means thereby removing the core member and wire from the ferrule whereby the hole is formed in the end of the ferrule.

15. A method as claimed in claim 14, comprising the further step of cutting the wire below the molded ferrule prior to removing the core member and the wire from the molded ferrule.

* * * * *